United States Patent
Ghosh et al.

(10) Patent No.: US 7,756,755 B2
(45) Date of Patent: Jul. 13, 2010

(54) CAPTURING AND UTILIZING CONSUMER PURCHASE INTENT INFORMATION

(75) Inventors: Riddhiman Ghosh, Sunnyvale, CA (US); Jhilmil Jain, Mountain View, CA (US); Mohamed E. Dekhil, Santa Clara, CA (US)

(73) Assignee: Hewlett-Packard Devlopment Company, L.P., Houston, TX (US)

( * ) Notice: Subject to any disclaimer, the term of this patent is extended or adjusted under 35 U.S.C. 154(b) by 0 days.

(21) Appl. No.: 11/823,520

(22) Filed: Jun. 28, 2007

(65) Prior Publication Data

US 2009/0006181 A1 Jan. 1, 2009

(51) Int. Cl.
*G06Q 30/00* (2006.01)
(52) U.S. Cl. ...................................................... 705/26
(58) Field of Classification Search .................. 705/26, 705/27, 14
See application file for complete search history.

(56) References Cited

U.S. PATENT DOCUMENTS

| | | | |
|---|---|---|---|
| 2005/0192870 A1* | 9/2005 | Geddes | 705/26 |
| 2005/0267810 A1* | 12/2005 | Zheng | 705/14 |
| 2006/0069749 A1* | 3/2006 | Herz et al. | 709/219 |
| 2007/0141540 A1* | 6/2007 | Borg | 434/127 |
| 2007/0229222 A1* | 10/2007 | Leeds | 340/5.91 |
| 2008/0021794 A1* | 1/2008 | Vega | 705/26 |
| 2008/0114714 A1* | 5/2008 | Vemuri | 706/48 |

OTHER PUBLICATIONS

Bellamy, et al., "Designing an E-Grocery Application for a Palm Computer: Usability and Interface Issues," IEEE Communications, Aug. 2001, pp. 60-64.
Mankoff, et al., "Domisilica: Providing Ubiquitous Access to the Home," Technical Report GIT-GVU-97-17, GVU Center, Georgia Institute of Technology, 1997.
Blythe, "Net Neighbors: Dependability, Accessibility and Online Shopping for Older People," HCI 2003 Workshop "Designing for Civil Society," 2003.
Richter, et al., "Multi-modal Framework to Support Users with Special Needs in Interaction with Public Information Systems," Mobile HCI, 2003.
Eardley, et al., "New Concepts to Support Working Parents in the Car," HP Labs Technical Report HPL-2004-37, 2004.
Ludford, et al., "Because I Carry My Cell Phone Anyway: Functional Location-Based Reminder Applications," Proc. CHI, 2006.
Menczer, et al., "IntelliShopper: A Proactive, Personal, Private Shopping Assistant," AAMAS '02, Jul. 15-19, 2002.
www.cozi.com, data is not known.
www.google.com/shoppinglist, data is not known.
www.wishpot.com, data is not known.
www.tali.com/slm, data is not known.

* cited by examiner

*Primary Examiner*—Mila Airapetian (57) ABSTRACT

System and method for capturing and utilizing consumer purchase intent information comprise obtaining item information, from a user, in a plurality of formats from a plurality of sources, extracting keywords from the item information, organizing item information and keywords in a shopping list, and enabling a display of the shopping list to the user.

23 Claims, 10 Drawing Sheets

CAPTURING AND UTILIZING CONSUMER PURCHASE INTENT INFORMATION

BACKGROUND

Shopping is a complex, social, and collaborative activity. Buying impulses may occur at any location and at any time. Consumers may not always have access to means for capturing the impulses when they occur. For example, consumers may not always have a pen and paper ready to jot down the items they intend to purchase. Buying impulses may comprise items consumers definitely want to purchase, items consumers may consider purchasing, or items consumers may want to research before purchasing. Consumers typically create multiple shopping lists and reminders (e.g., a shopping list posted on the refrigerator door, an email reminder, or lists on scraps of paper, etc.) to keep track of purchase intent. In order for the lists to be helpful, consumers have to remember to take the lists along on each relevant shopping trip.

Retail stores may keep record of items purchased by consumers. However, the stores generally have no way of knowing the items that the consumers intend to purchase. Consumer purchase intent information may be useful for stores to more effectively adjust inventory based on trends of most wanted products and personalize recommendations to each consumer, thereby increasing profitability to the stores.

Thus, a market exists for a method to efficiently capture and utilize consumer purchase intent information.

SUMMARY

An exemplary method for capturing and utilizing consumer purchase intent information comprises obtaining item information, from a user, in a plurality of formats from a plurality of sources, extracting keywords from the item information, organizing the item information and keywords in a shopping list, and enabling a display of the shopping list to the user.

Other embodiments and implementations are also described below.

DETAILED DESCRIPTION

I. Overview

Exemplary processes and systems for capturing and utilizing consumer purchase intent information are described herein.

Section II describes exemplary system and processes for capturing and utilizing consumer purchase intent information.

Section III describes an exemplary computing environment.

Figure 1:
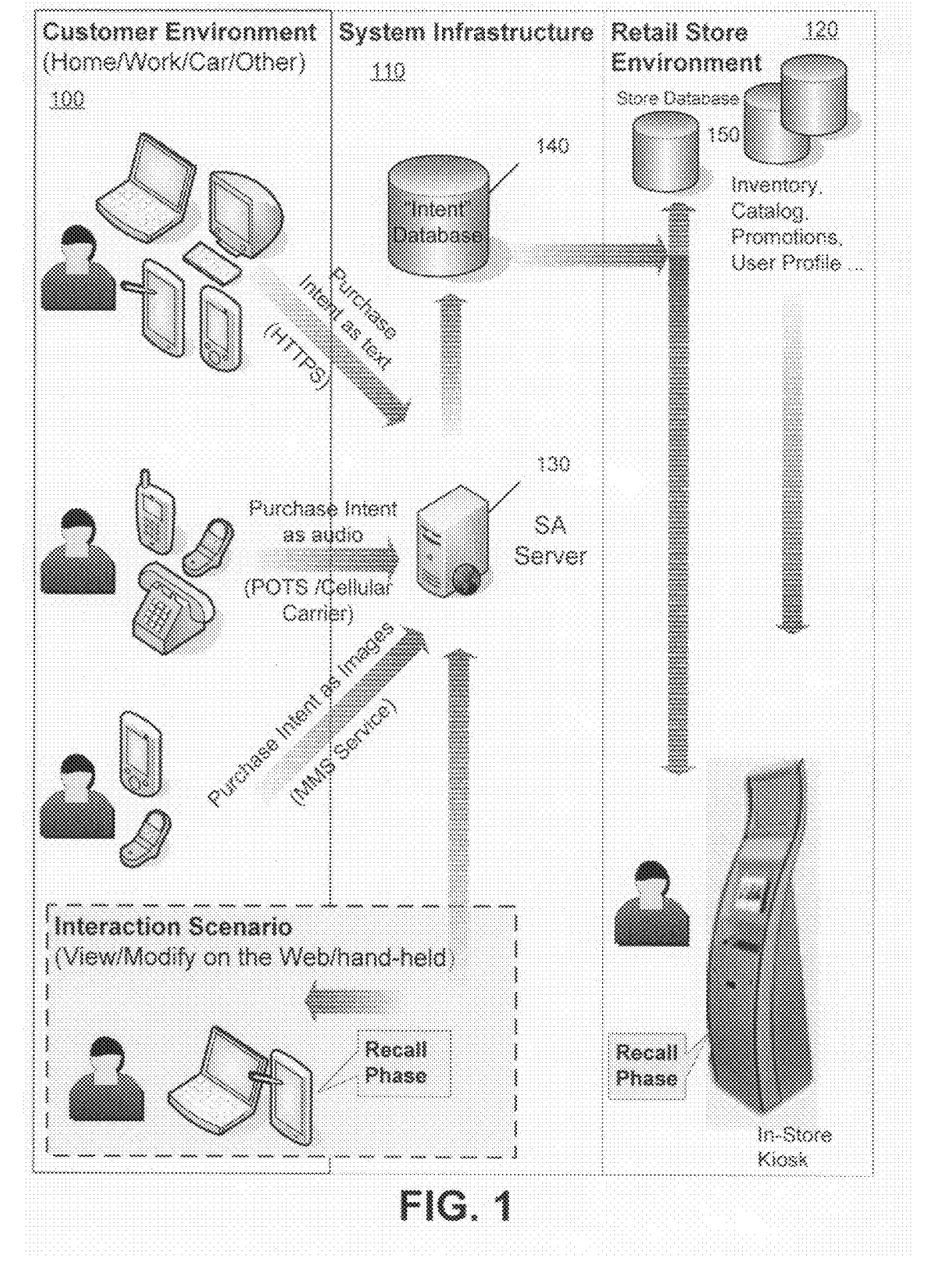
FIG. 1 illustrates an exemplary system for capturing and utilizing consumer purchase intent information.

II. Exemplary System and Processes for Capturing and Utilizing Consumer Purchase Intent Information FIG. 1 illustrates an overview of an exemplary system for capturing and utilizing consumer purchase intent information. For ease of explanation, FIG. 1 is divided into three parts: the customer environment 100, the system infrastructure 110, and the retail store environment 120.

In the customer environment 100, a consumer can interact with the system 110 at any place, any time, and any environment. For example, a consumer can interact with the system 110 by using a computing device (e.g., a PC, a laptop computer, any handheld computing device, etc.) over a network (e.g., the Internet), by using a phone device (e.g., a telephone, a cellular phone, etc.) over the analog or digital telecommunications network, by using any image capturing device (e.g., a network-enabled camera, a camera phone, a scanner, etc.) over a network (e.g., the Internet). Input to the system 110 can be in different formats including, without limitation, text, audio data, image data, short message service (SMS), and other data formats. For example, a consumer may use a computer to email a text list of items, use a phone to leave a voice message with a list of items, use a digital camera to take a picture of an item, use a scanner to scan a shopping list or barcodes of items, and send an SMS message from a cell phone. Item information received at the system 110 can be processed and compiled into one or more shopping lists which can be accessible to the consumer at any participating store or using any of the consumer's own devices. For ease of explanation, the words "consumer" and "user" will be used interchangeably herein.

The exemplary system infrastructure 110, includes a shopping assistant server 130 (or SA server) and an intent database 140. The SA server 130 receives purchase intent information, in the form of item information, from consumers. The item information may be sent in a plurality of formats from a plurality of sources. The received item information is processed by the SA server 130 to determine the items the consumers intend to purchase, if possible, and the information is stored in the intent database 140. For example, keywords may be extracted from text data received from a consumer and the keywords may be stored in the intent database 140 for facilitating a later compilation of a shopping list for the consumer. An exemplary implementation of the SA server 130 will be described in more detail below with reference to FIG. 10.

The exemplary retail store environment 120 includes a store database 150 and a kiosk. The database 150 includes data relevant to each store. For example, store data may include inventory data, store catalog, promotions, user profiles, and/or other data. Alternatively or in combination, store database 150 may include some or all data from the intent database 140. A kiosk may be implemented on any computing device, whether stand-alone, mobile, or otherwise.

A consumer at a store may walk up to a kiosk and request a shopping list. The shopping list may include all items previously provided to the SA server 130 or a subset of the list that is relevant to the particular store. For example, if the consumer is at a grocery store, the shopping list may only include grocery items previously provided by the consumer. The kiosk may be enabled to display and/or print shopping lists. For example, the kiosk may include a web browser able to download and print shopping lists from the server 130. Alternatively or in combination, shopping lists can be accessed at any consumer computing or mobile device. For example, the relevant shopping list may be sent directly from the SA server 130 to a consumer's device. Relevant shopping list may also be sent from a kiosk to a consumer's device.

In an exemplary implementation, the relevant shopping list may also include store specific promotions, coupons, recommendations, or other store-specific information based on the content of the shopping list. For example, keywords extracted from the item information may be used to search the store database 150 for relevant store information.

Figure 2:
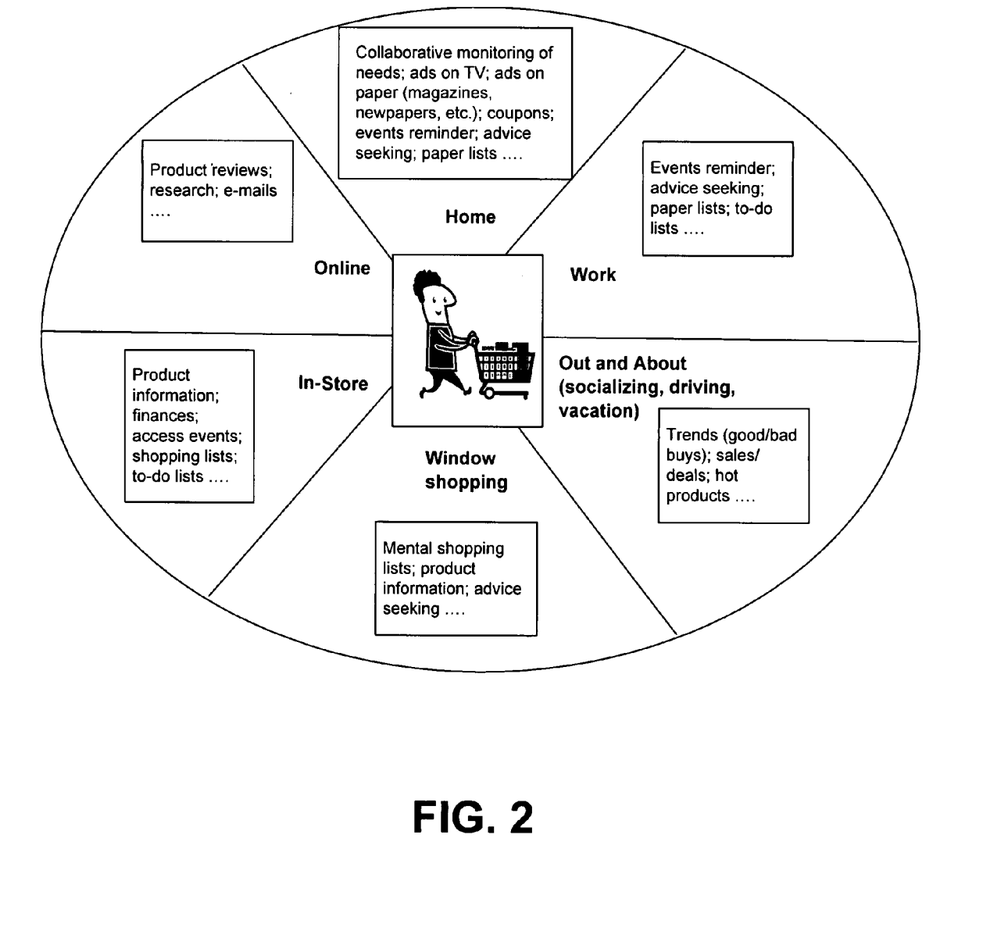
FIG. 2 illustrates an exemplary representation of various locations where purchase intent may occur.

FIG. 2 illustrates an exemplary representation of different locations where purchase intent may arise. For example, and without limitation, purchase intent may occur at home, at work, while browsing online, while browsing in a physical store, while window shopping, while the consumer is out and about (e.g., socializing, driving, on vacation, etc.). Purchase intent can be captured in different formats from different sources. Purchase intent includes any intent information relating to making a purchase. For example, and without limitation, purchase intent may include purchase impulses, research information (e.g., research item features, peer advice on products, etc.), final purchase decisions, and/or other purchase information.

Figure 3:
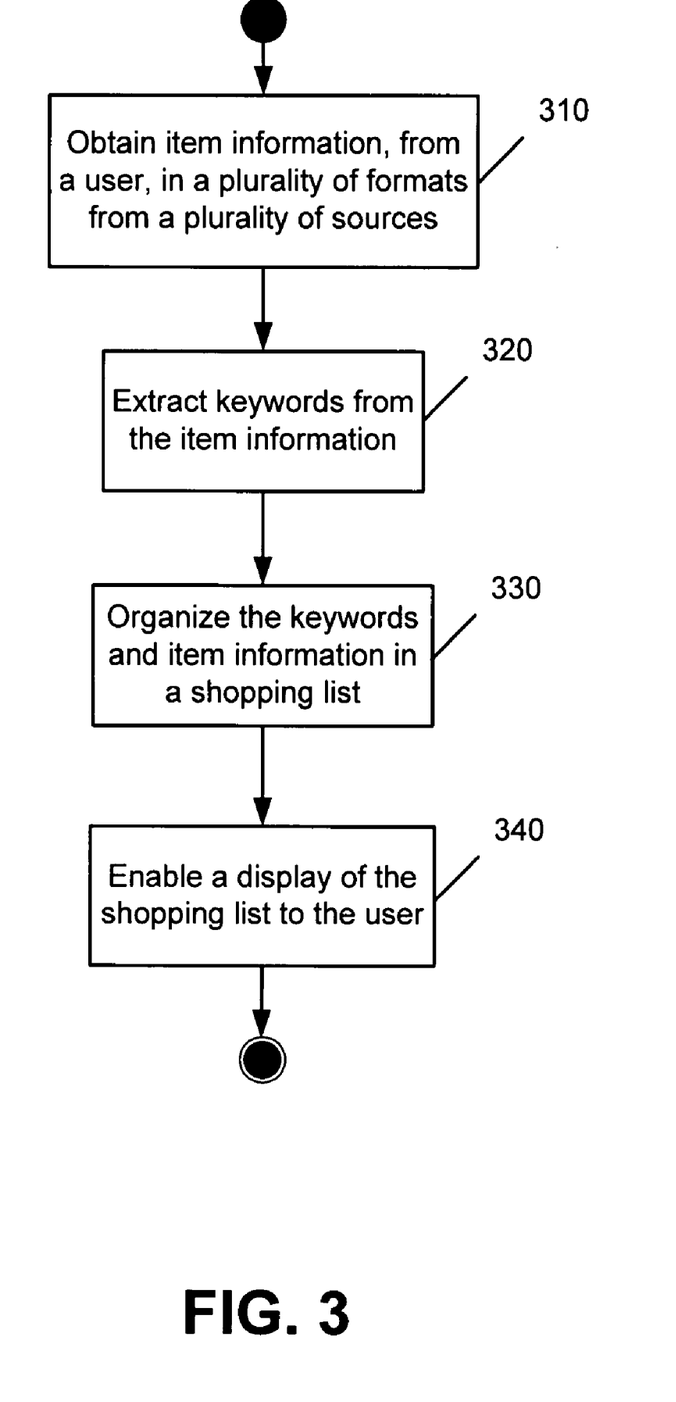
FIG. 3 illustrates an exemplary process for capturing and utilizing consumer purchase intent information.
Figure 4:
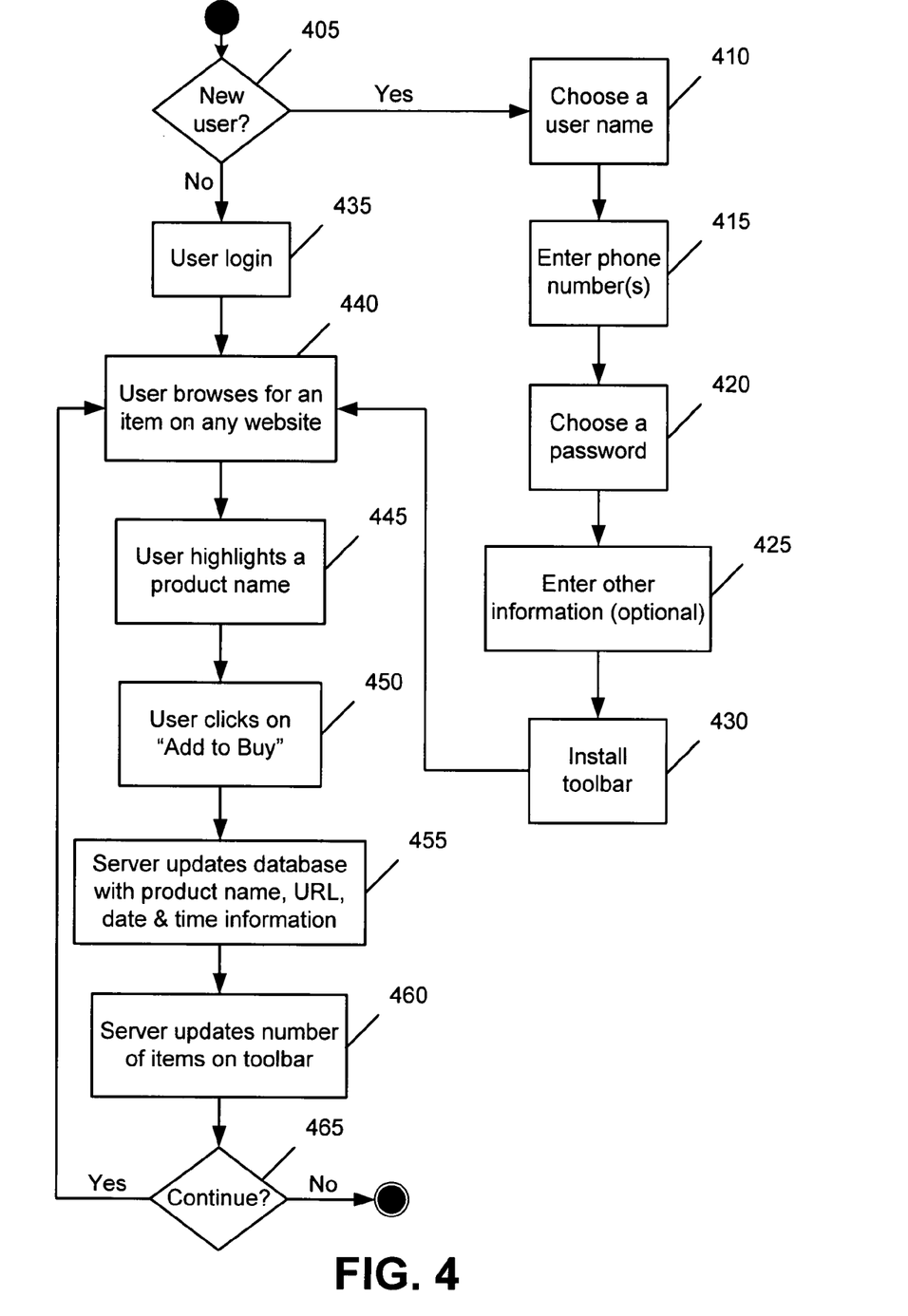
FIG. 4 illustrates an exemplary process for capturing purchase intent information using a web-based interface.
Figure 6:
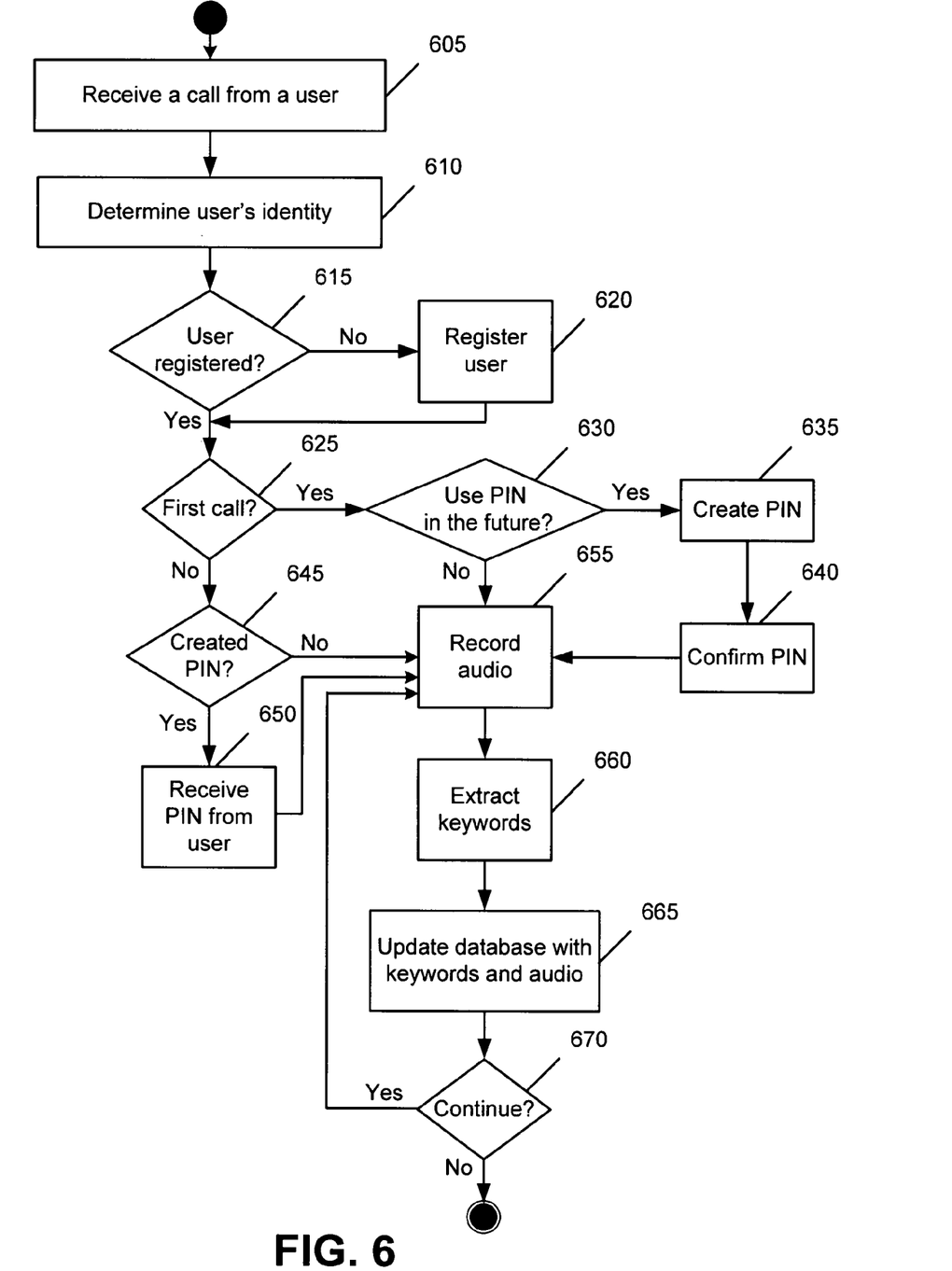
FIG. 6 illustrates an exemplary process for capturing intent information in an audio format.
Figure 7:
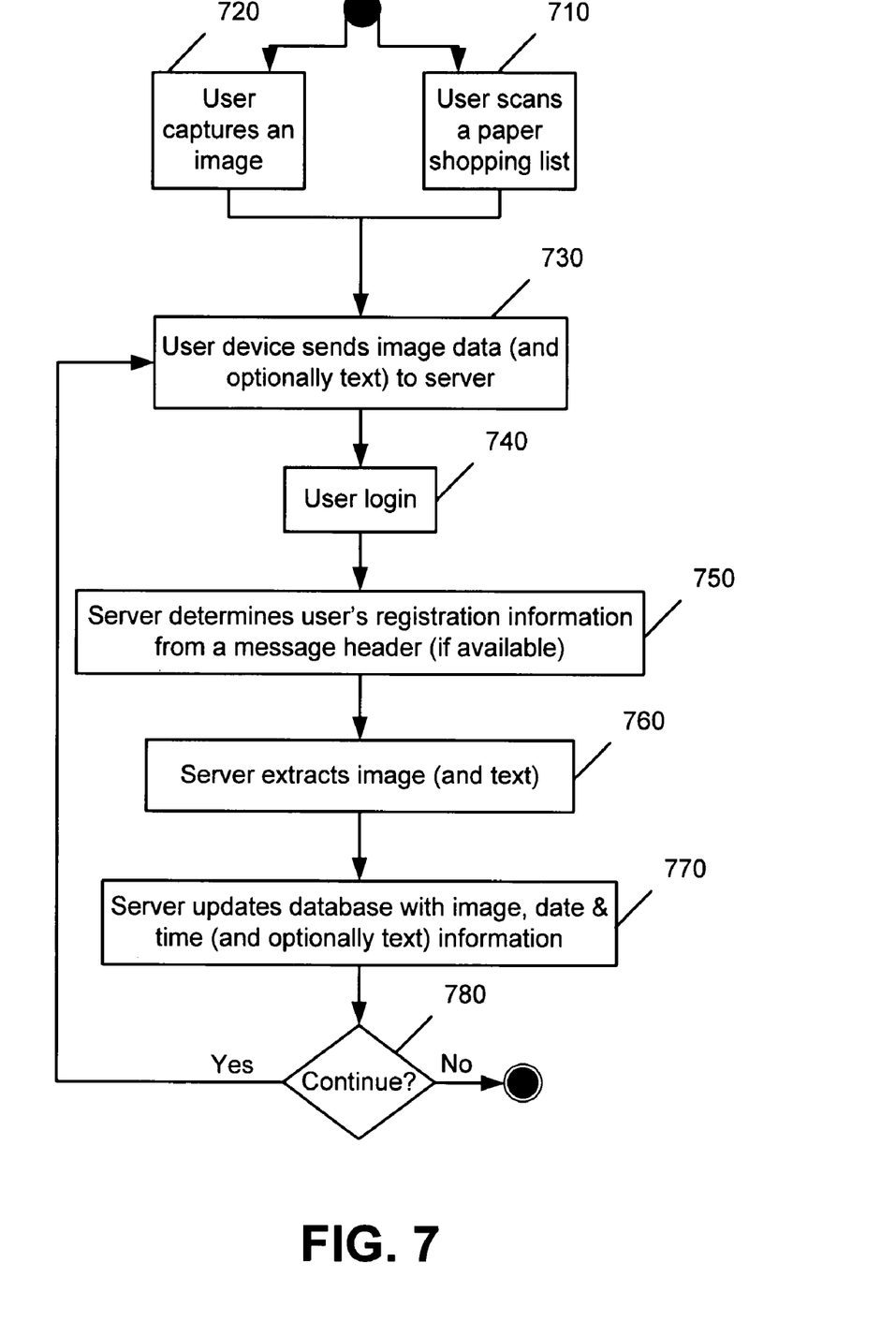
FIG. 7 illustrates an exemplary process for capturing intent information in an image format.
Figure 8:
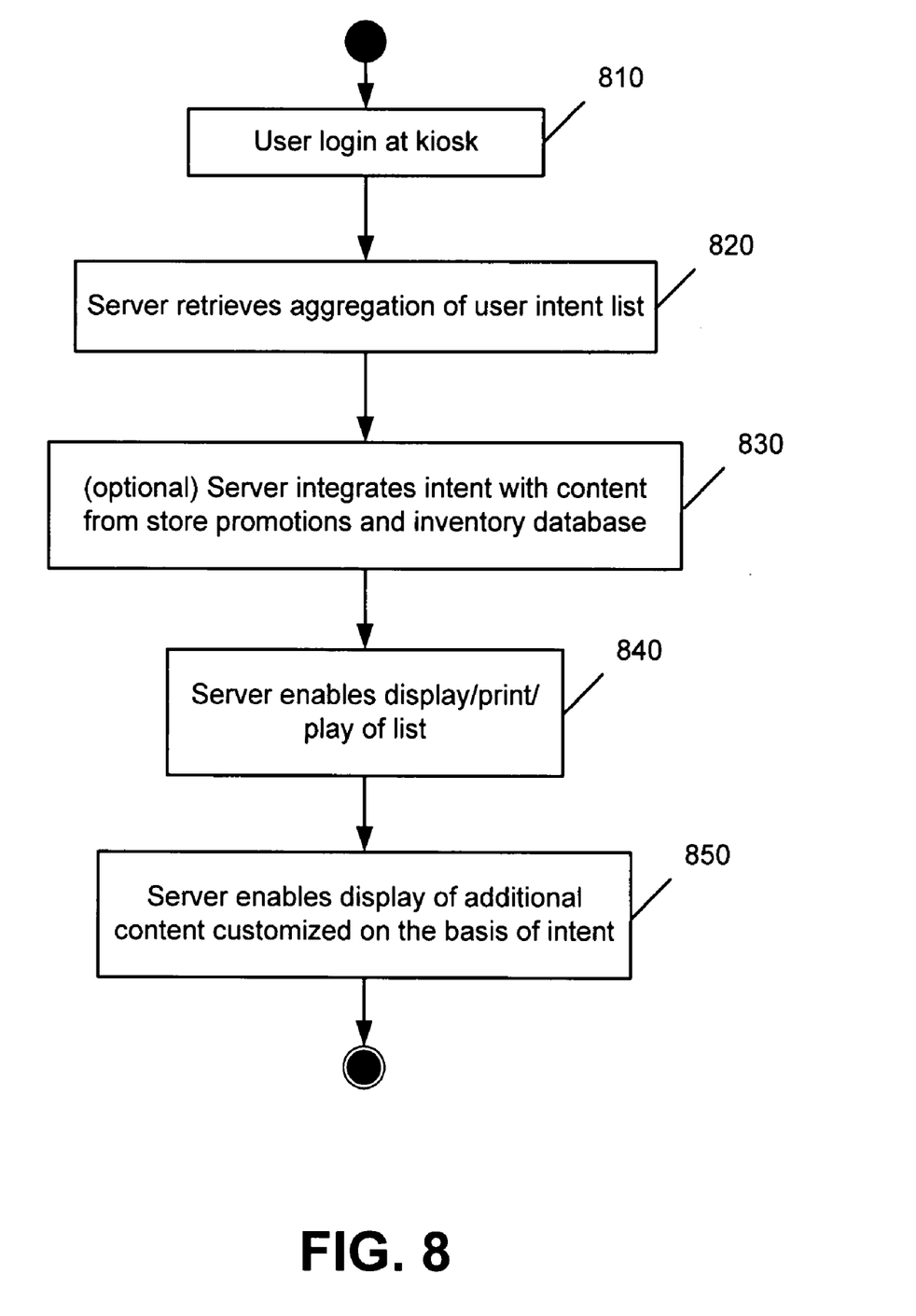
FIG. 8 illustrates an exemplary process for recalling intent information at a kiosk.

FIG. 3 illustrates an exemplary overview process for capturing and utilizing purchase intent information. FIGS. 4, 6 and 7 illustrate exemplary processes for capturing purchase intent information via a web-based interface, via an audio source, and via an image source, respectively. FIG. 8 illustrates an exemplary process for using purchase intent information.

FIG. 3 illustrates an exemplary overview process for capturing and utilizing purchase intent information.

At step 310, item information is obtained from a consumer in a plurality of formats from a plurality of sources. For example, the information may be in text, audio, image, video, and/or other formats. The information may be obtained from a web browser, a phone, a camera, a mobile device, or other devices.

At step 320, keywords are extracted from the item information. Not all item information formats are amenable to keyword extraction. In this case, keywords can be generated based on any suitable analysis scheme. In general, text information and audio data are especially suitable for keyword extraction. Image data may be analyzed by using any image processing technology known in the art. The item information and any extracted keyword are stored in a database (e.g., the intent database 140).

At step 330, the extracted keywords and item information are organized in a shopping list. For example, keywords are organized with other item information with which keywords cannot be readily extracted (e.g., image data) in the same shopping list. In an exemplary implementation, keywords may be used to search a store database for relevant promotions, sales, and/or recommendations to be presented to the consumer. The relevant store information can be incorporated into the shopping list. In an exemplary implementation, the shopping list may include items indirectly related to shopping (e.g., reminders).

At step 340, a display of the shopping list to the consumer is enabled. The shopping list may be multimodal. In an exemplary implementation, the consumer may view and/or print the shopping list at an in-store kiosk. In another exemplary implementation, the consumer may use any other computing device to view and/or otherwise access (including print) the shopping list.

FIG. 4 illustrates an exemplary process for capturing consumer purchase intent using a web browser. A user is a consumer using the system to capture his or her purchase intent.

At step 405, whether a user is a new user is determined.

If so, at steps 410-430, a registration process is performed to enable the user to use the system for capturing purchase intent. Although a registration process is not repeated with reference to FIGS. 6 and 7, one skilled in the art will recognize that a similar registration process for a first time user may be implemented through use of any other device (e.g., a web-enabled phone, a personal digital assistant, etc.).

At step 410, the user is prompted to choose a user name.

At step 415, the user is prompted to enter one or more phone numbers. The phone numbers may be used for identifying the user. Alternatively or in combination, the user may be enabled to enter any other combination of alphanumeric characters for registration purposes.

At step 420, the user is prompted to choose a password. In an exemplary implementation, steps 415 and 420 may be combined as a single step such that the phone number (or any other alphanumeric characters) provided by the user may be used as a password.

At step 425, the user may optionally be prompted to enter any other information. For example, the user may wish to provide demographic information and/or other personal information. In an exemplary implementation, a registered user may be issued a loyalty card which can be used at any participating store to easily obtain the user's shopping list.

Figure 5:
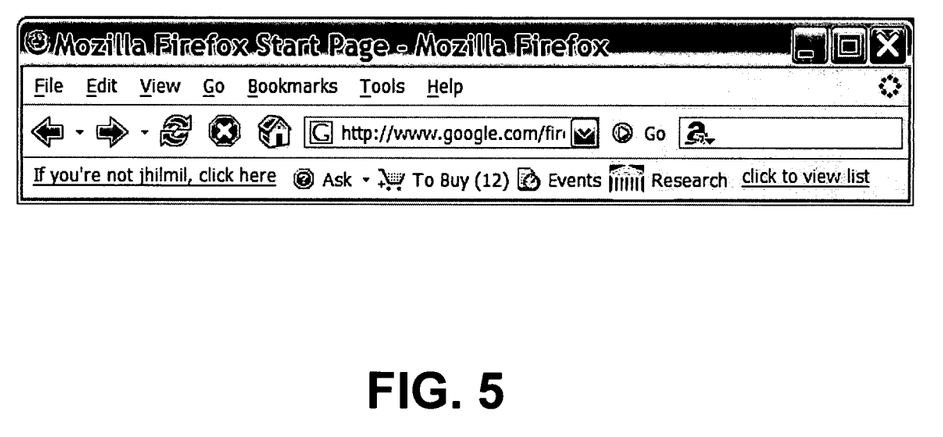
FIG. 5 illustrates an exemplary representation of a web browser toolbar extension.

At step 430, the user is registered and a toolbar extension application is downloaded onto the user's computing device. In an exemplary implementation, the toolbar extension does not change the general appearance of the user's original browser screen other than adding another row of control buttons. FIG. 5 illustrates an exemplary representation of a toolbar extension added to a typical browser control panel. The exemplary toolbar extension (i.e., the bottom-most row) includes at least an icon of a shopping cart and a counter for providing a quick reference of the number of items the user intends to purchase that have already been placed in the shopping cart.

At step 440, the user browses on any web site.

At steps 445 and 450, the user's purchase intent can be captured by highlighting a product and clicking on the "To buy" button in the toolbar extension.

At step 455, when an item is added to the shopping cart, a request is sent to the server 130 to update the intent database 140 with the product name, the Web page URL, and the date and time.

At step 460, the server updates the number of items displayed on the toolbar.

At step 465, if the user continues to browse, the process may continue at step 440.

A user is not restricted on the type of product or web site for capturing purchase intent. Thus, any product can be added to the shopping list from any website. In an exemplary implementation, other information such research of an item or a reminder to buy an item for a particular event can be added to the shopping cart. Different users can collaboratively add to the same shopping list by using the same login information. The toolbar extension application can be implemented in any Web browser (e.g., Firefox® browser, Microsoft® Internet Explorer, etc.).

FIG. 6 illustrates an exemplary process for capturing purchase intent as audio data.

At step 605, a call from a user is received at system 110. In an exemplary implementation, a registered user may have pre-programmed his or her phone to speed dial a server-provided number (e.g., provided during registration).

At step 610, the user's identify is determined. In an exemplary implementation, the user's phone number and/or other identifier is compared by the server 130 to a database (e.g., the intent database 140).

At step 615, whether the user had previously registered is determined. If not, the user is passed to a registration process at step 620. The registration process may be similar to steps 410-425 except some or all process steps are performed over the telephone. Alternatively, depending on design choice, the user may be instructed to register by accessing a particular web site using a network-enabled device.

If the user is already registered, at step 625, whether the user is making his or her first call is determined. If the user is making his or her first call to the system 110, at step 630, the user may be prompted to decide whether to use a personal identification number (PIN) in the future. If the user decides to use a PIN in the future, at step 635, the user is prompted to create a PIN. In an exemplary implementation, a PIN may be automatically generated by the server 130. At step 640, the PIN is confirmed and the process continues at step 655.

Referring back to step 630, if the user decides not to use a PIN in the future, the process continues at step 655.

Referring back to step 625, if the user is not making his or her first call to the system 110, at step 645, whether the user has previously created a PIN is determined. If not, the process continues at step 655. If the user has previously created a PIN, at step 650, the PIN is obtained from the user and the process continues at step 655 after the PIN has been verified by the system 110.

At step 655, the user is prompted to provide item information (e.g., a list of items) and the information is recorded as audio data. In an exemplary implementation, a notification message from the user is received by the server 130, the message is parsed by the server 130 to download the audio data, and the audio data is processed by a speech recognition/processing module accessible to the server 130. Speech recognition techniques are well known in the art and need not be described in more detail herein.

At step 660, keywords are extracted from the audio data to determine the corresponding items that the user intends to purchase. In an exemplary implementation, extracted keywords can be used to compile a shopping list and retrieve relevant store promotions, coupons, and/or product recommendations. The keywords may also be useful to a store for making business decisions including determining inventory levels of different products. In an exemplary implementation, other processing of the audio data may be performed. For example, noise words may be discarded. In another example, a stemming algorithm known in the art may be applied.

At step 665, the intent database 140 is updated with the keywords, the audio data, as well as date and time information. In an exemplary implementation, a user has a choice of recalling the audio data and/or the items derived from the audio data in a shopping list.

At step 670, whether the user wishes to continue with recording of other item information is determined. If so, the process continues at step 655. If not, the call session is terminated.

Audio data may be received over any device capable of transmitting audio data to the system 110. For example, any analog phone (over the POTS network), digital phone (over the cellular network or voice over IP), and/or other devices using other communication standards yet to be developed may be implemented to enable users to provide audio data to the system 110. In an exemplary implementation, a user can repeat this process several times over the course of any period of time. In yet another example, when a user is in a situation where the user cannot use a phone to leave a voice list and does not have access to the Internet, (e.g. in a meeting) the user can SMS the item information (e.g., product names) by dialing the phone number previously obtained during registration.

FIG. 7 illustrates an exemplary process for capturing consumer purchase intent information in the image data format.

At step 710, a user scans a paper shopping list with any device having a scanner. In another exemplary implementation, the user may scan other representations of a shopping list, images of items (e.g., photographs, etc.), or barcodes of items.

At step 720, a user captures an image with an image capturing device (e.g., a camera, a video camera, etc.).

At step 730, a user device is used to send images (and optionally text) to the server 130 (e.g., in the form of a message). In an exemplary implementation, if the image is being sent from a camera phone, it may be sent in accordance with the multimedia messaging service (MMS) standard At step 740, the user is prompted to login. In an exemplary implementation, the user may provide one or more identifiers (e.g., username, password, phone number, etc.) that were previously registered with the server 130.

At step 750, the user's registration information may be determined based on the message header. For example, the header of an MMS message may be parsed to determine the registration information.

At step 760, the image data (and optionally text) are extracted from the message.

At step 770, the image data are analyzed and the intent database 140 is updated with the image, date, time, and optionally text information. At step 780, whether the user has sent another message is determined. If so, the process continues at step 730. If not, the session is terminated. In an exemplary implementation, the user may be prompted to logout or may be automatically logged out upon an occurrence of an event (e.g., a lapse of a period of time, etc.). In an exemplary implementation, when a user sees an ad on TV or magazine, or a friend recommends a particular product, the user can take a picture of the product using his camera phone and send the image via MMS to the server 130 to capture his or her purchase intent.

The processes described above with reference to FIGS. 4, 6, and 7 are merely exemplary. A person skilled in the art will recognize that other processes may be implemented to capture consumer purchase intent in any desirable format from multiple different sources.

FIG. 8 illustrates an exemplary process for enabling a user to recall a shopping list at an in-store kiosk. In another exemplary implementation, the user may alternatively, or in combination, be enabled to obtain a shopping list at any user device.

At step 810, a user is prompted to login at an in-store kiosk. If the user has been issued a loyalty card, the user may be able to insert the card into the kiosk to initiate the shopping list retrieval process.

At step 820, the aggregation of user intent data is retrieved from the intent database 140.

At 830, a shopping list comprising item information and keywords may be integrated with store-specific data from the store database 150.

At step 840, the shopping list is displayed or printed to the user.

At step 850, any additional content may be displayed to the user (e.g., store promotions, etc.).

Figure 9:
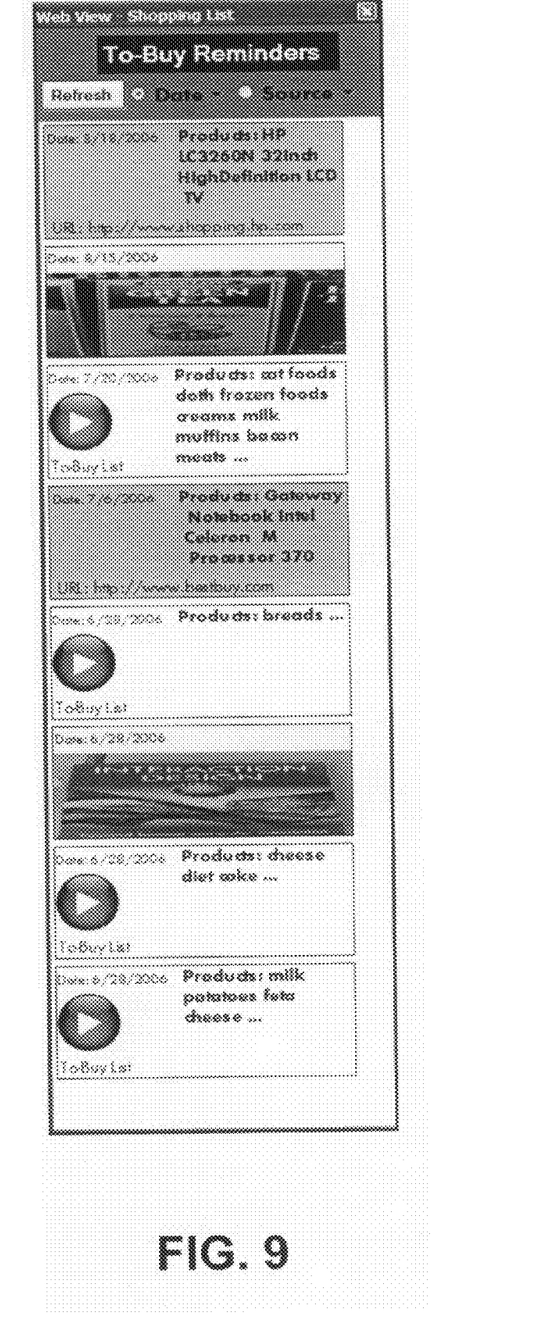
FIG. 9 illustrates an exemplary shopping list displayable to a consumer.

FIG. 9 illustrates an exemplary shopping list display layout. In the exemplary shopping list, some items are displayed as text, some are as images, some have play-enabled graphical buttons that enable a user to listen to audio recordings. As a result, item information obtained in different formats from different sources obtained at different times can be aggregated and presented to the user in one consolidated list.

The shopping list can be sorted in different ways depending on design choice. For example, and without limitation, the list can be sorted by date, time, data format, data source, category of items, in ascending or descending order, etc.

Figure 10:
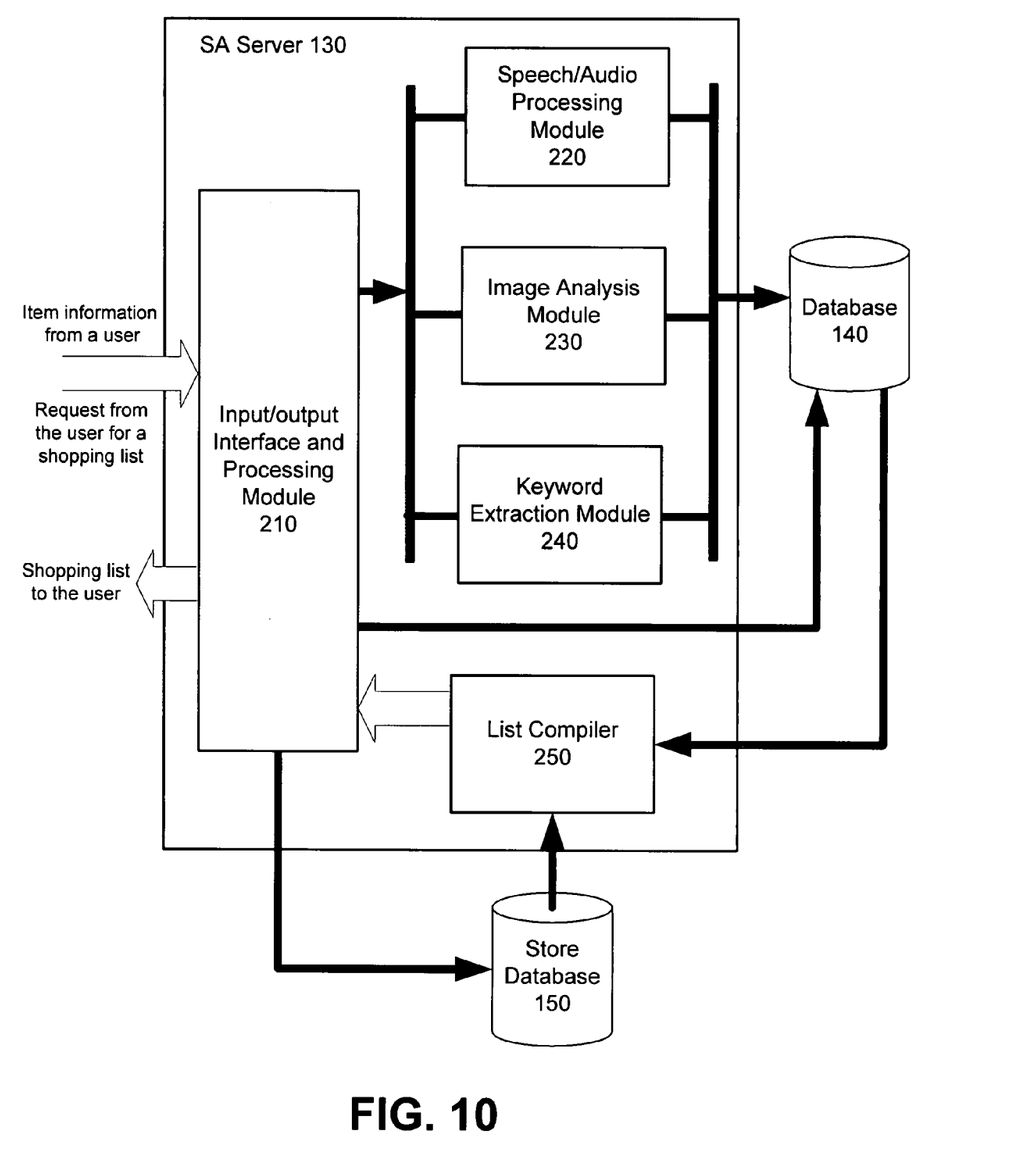
FIG. 10 illustrates an exemplary server for capturing and utilizing consumer purchase intent information.

FIG. 10 illustrates an exemplary implementation of a SA server 130. The server 130 includes an input/output interface and processing module 210, a speech/audio processing module 220, an image analysis module 230, a keyword extraction module 240, and a list compiler module 250.

The input/output and processing module 210 receives item information from a user in a plurality of formats from a plurality of sources. For each piece of item information received, the input/output and processing module 210 determines whether and what type of additional processing is needed. For example, if the item information is in the format of audio data, it may be sent to the speech/audio processing module 220, and the keyword extraction module 240 for further processing. If the item information is text, it may be sent to the keyword extraction module 240. If the item information is in the format of image data, it may be sent to the image analysis module 230 and optionally to the keyword extraction module 240. All item information and keywords extracted from the item information are stored in the intent database 140.

The input/output and processing module 210 receives a request from a user to obtain a shopping list. The input/output and processing module 210 queries the database 140 for information relevant to the user to compile a shopping list for the user. The database 140 provides the requested information to the list compiler module 250 which compiles a shopping list (e.g., the list shown in FIG. 9). The shopping list is sent to the input/output and processing module 210 which enables an output of the shopping list to the user (e.g., by enabling a display, a print out, etc.). In an exemplary implementation, input/output and processing module 210 may also query a store database 150 to provide store specific data to the list compiler module 250. In this implementation, the shopping list may include (or otherwise reference to) relevant store-specific data.

For example, when a user visits a store, the user can walk up to an in-store kiosk to get his "shopping list." The user can print out or listen to the aggregation of his purchase intent captured over any period of time (e.g., a day, a week, a month, etc.). Optionally, the in-store kiosk can use the captured purchase intent to deliver coupons, offers, product recommendations or product advice to the user to assist him in his shopping experience. In an exemplary implementation, users may be enabled to access and manage a shopping list (e.g., using a Web browser) and enabled to listen to or view a shopping list from any user device (e.g., cell phone).

In an exemplary implementation, the database 140 can be implemented by using SQL® Server 2005 and/or other suitable application known in the art. The server 130 functionality and the hosting of the registration process, extension, shopping list interface on the kiosk and user device, and updates to the database can be implemented using Microsoft® IIS, Apache Tomcat® or any other suitable application known in the art. The speech recognition functionality can be realized using Dragon® Naturally Speaking or any other suitable speech recognition engine. The kiosk platform can be implemented using a Microsoft® Windows XP based platform or any other suitable platform. The software to run on the platform is Microsoft® NET 2.0 or any other suitable software.

III. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate general-purpose processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

IV. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alpha-numeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method for capturing and utilizing consumer purchase intent information, comprising:
    obtaining consumer purchase intent information in a plurality of formats from a plurality of sources, said formats including text, audio data and image data;
    extracting keywords from said audio data using a speech recognition process;
    extracting keywords from said image data using a character recognition process; and
    organizing said consumer purchase intent information and keywords in a shopping list.

2. The method of claim 1, wherein said sources includes a phone.

3. The method of claim 1, wherein said sources includes a web browsing device.

4. The method of claim 1, wherein said sources includes an image capturing device.

5. The method of claim 1, wherein said purchase intent information includes data and time information.

6. The method of claim 1, wherein said extracting includes analyzing image data.

7. The method of claim 1, wherein said extracting includes analyzing audio data.

8. The method of claim 1, wherein said organizing includes adding relevant store-specific information, based on said extracted keywords, in said shopping list.

9. The method of claim 1, wherein said shopping list consists of items specific to a category of stores.

10. A system for capturing and utilizing consumer purchase intent information, comprising:
 a database; and
 a server coupled to said database, said server including:
  a processing module configured to receive consumer purchase intent information in a plurality of formats from a plurality of sources, said formats including text, audio data, and image data;
  a keyword extraction module configured to:
  extract keywords from said audio data using a speech recognition process; and
  extract keywords from said image data using a character recognition process;
  a list compiling module configured to organize a shopping list, including said consumer purchase intent information and keywords obtained from said database; and
  an output module configured to enable a display of said shopping list to said user.

11. The system of claim 10, wherein said server further comprises an image analysis module for analyzing image data.

12. The system of claim 10, wherein said server further comprising an audio data processing module for analyzing audio data.

13. The system of claim 10, wherein said shopping list includes store-specific information relevant to items on said shopping list.

14. The system of claim 10, wherein said shopping lists consists of items specific to a category of stores.

15. The system of claim 10, wherein said sources include an image capturing device.

16. A computer-readable storage medium for capturing and utilizing consumer purchase intent information, comprising logic instructions that, if executed:
 obtain consumer purchase intent information in a plurality of formats from a plurality of sources;
 extract keywords from said audio data using a speech recognition process;
 extract keywords from said image data using a character recognition process; and
 organize said consumer purchase intent information and keywords in a shopping list.

17. The computer-readable medium of claim 16, wherein said instructions for extracting keywords includes instructions that, if executed, analyze image data.

18. The computer-readable storage medium of claim 16, wherein said instructions for extracting keywords includes instructions that, if executed, analyze audio data.

19. The computer-readable storage medium of claim 16, wherein said shopping list includes store-specific information relevant to items on said shopping list.

20. The computer-readable storage medium of claim 16, wherein said shopping list consists of items specific to a category of stores.

21. The method of claim 1, wherein said purchase intent includes any intent information relating to making a purchase.

22. The system of claim 10, wherein said purchase intent includes any intent information relating to making a purchase.

23. The computer-readable storage medium of claim 16, wherein said purchase intent includes any intent information relating to making a purchase.

* * * * *

UNITED STATES PATENT AND TRADEMARK OFFICE
CERTIFICATE OF CORRECTION

PATENT NO. : 7,756,755 B2  Page 1 of 1
APPLICATION NO. : 11/823520
DATED : July 13, 2010
INVENTOR(S) : Riddhiman Ghosh et al.

It is certified that error appears in the above-identified patent and that said Letters Patent is hereby corrected as shown below:

On the Title page, item (73), Assignee, in column 1, line 1,
delete "Devlopment" and insert -- Development --, therefor.

In column 9, line 6, in Claim 5, delete "data" and insert -- date --, therefor.

Signed and Sealed this

Twenty-sixth Day of October, 2010

David J. Kappos
*Director of the United States Patent and Trademark Office*